United States Patent
Huene et al.

(10) Patent No.: US 7,657,869 B2
(45) Date of Patent: Feb. 2, 2010

(54) INTEGRATION OF EXTERNAL TOOLS INTO AN EXISTING DESIGN ENVIRONMENT

(75) Inventors: Peter C. Huene, Kirkland, WA (US); Joshua C. Shepard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 560 days.

(21) Appl. No.: 10/772,902

(22) Filed: Feb. 5, 2004

(65) Prior Publication Data
US 2005/0177818 A1   Aug. 11, 2005

(51) Int. Cl.
G06F 9/44   (2006.01)

(52) U.S. Cl. .................. 717/109; 717/113; 717/120; 717/121

(58) Field of Classification Search ............. 717/109, 717/113, 120, 121
See application file for complete search history.

(56) References Cited

U.S. PATENT DOCUMENTS

| | | | | |
|---|---|---|---|---|
| 5,454,109 | A | * | 9/1995 | Bruynooghe et al. ........ 717/100 |
| 5,832,271 | A | * | 11/1998 | Devanbu ..................... 717/106 |
| 5,862,379 | A | * | 1/1999 | Rubin et al. ................ 717/109 |
| 5,909,577 | A | * | 6/1999 | Devanbu ..................... 717/127 |
| 5,950,000 | A | * | 9/1999 | O'Leary et al. ............. 717/105 |
| 5,960,202 | A | * | 9/1999 | Granston et al. ............ 717/141 |
| 5,966,538 | A | * | 10/1999 | Granston et al. ............ 717/158 |
| 6,167,564 | A | * | 12/2000 | Fontana et al. .............. 717/114 |
| 6,817,005 | B2 | * | 11/2004 | Mason et al. ................. 716/16 |
| 2003/0140333 | A1 | * | 7/2003 | Odaka et al. ................ 717/115 |

OTHER PUBLICATIONS

Mahler, et al "Integrating Configuration Management into a Generic Environment", 1990, ACM, p. 229-237.*
Braun, V. et al. "Integrating Tools in the ETI Platform", *International Journal on Software Tools for Technology Transfer*, 1997, 1, 1-5, 31-48.
Grundy, J. et al., "Tool Integration, Collaboration and User Interaction Issues in Component-based Software Architectures", *Technology of Object-Oriented Languages and Systems(Tools-28)*, 1998, 299-312.
Khanvilkar, S. et al., "Tool Integration for Flexible Simulation of Distributed Algorithms", *Software Practice and Experience*, 2001, 31, 1363-1380.
Mernik, M. et al., "Compiler/Interpreter Generator System LISA", *Proceedings of the 33$^{rd}$ Hawaii International Conference on System Sciences*, 2000, 1-10.
Thomas, I. et al., "Definitions of Tool Integration for Environments", *IEEE Software/IEEE Computer Society [and] the Institute of Electrical and Electronics Engineers, Inc.*, 1992, 28-35.

* cited by examiner

*Primary Examiner*—Wei Y Zhen
*Assistant Examiner*—Qamrun Nahar
(74) *Attorney, Agent, or Firm*—Woodcock Washburn LLP

(57) ABSTRACT

Custom build tools are integrated into a design environment build process without writing code. Properties of the tool are defined in a file describing the appropriate syntax of the tool's command line. Values are specified for a particular use of the tool in a particular project. At runtime the command line for the tool is generated from the generalized syntax as defined in the file and the stored values.

14 Claims, 21 Drawing Sheets

```xml
<?xml version="1.0" encoding="utf-8"?>
<VisualStudioToolFile
        Name="Sample Tool File"
        >
        <Rules>
                <CustomBuildRule
                        Name="Sample Rule"
                        DisplayName="Sample Rule"
                        CommandLine="mytool.exe [SearchPaths] [WarningLevel] [IterationCount] [WarningsAsErrors] [SearchString] [Inputs]"
                        Outputs="$(InputName).bar"
                        FileExtensions="*.foo"
                        ExecutionDescription="Executing sample rule..."
                        SupportsFileBatching="true"
                        BatchingSeparator=" "
                        ShowOnlyRuleProperties="true"
                        >
                        <Properties>
                                <StringProperty
                                        Name="SearchPaths"
                                        DisplayName="Search Paths"
                                        Description="The semi-colon delimited list of paths to search."
                                        HelpURL="http://msdn.microsoft.com"
                                        Switch="/P [value]"
                                        Delimited="true"
                                        Inheritable="true"
                                />
                                <EnumProperty
                                        Name="WarningLevel"
                                        DisplayName="Warning Level"
                                        PropertyPageName="Advanced"
                                        Description="Sets the warning level. Level 1 is the lowest. Level 4 is the highest."
                                        HelpURL="http://msdn.microsoft.com"
                                        >
                                        <Values>
                                                <EnumValue
                                                        Value="0"
                                                        Switch="/W1"
                                                        DisplayName="Warning Level 1"
```

FIG. 3a

```xml
                                            <EnumValue
                                                    Value="1"
                                                    Switch="/W2"
            DisplayName="Warning Level 2"
                                            />
                                            <EnumValue
                                                    Value="2"
                                                    Switch="/W3"
            DisplayName="Warning Level 3"
                                            />
                                            <EnumValue
                                                    Value="3"
                                                    Switch="/W4"
            DisplayName="Warning Level 4"
                                            />
                                    </Values>
                            </EnumProperty>
                            <IntegerProperty
                                    Name="IterationCount"
                                    DisplayName="Iteration Count"
                                    Description="Specifies the number of
iterations performed by the tool."
                                    HelpURL="http://msdn.microsoft.com"
                                    Switch="/count:[value]"
                                    DefaultValue="1"
                            />
                            <BooleanProperty
                                    Name="WarningsAsErrors"
                                    DisplayName="Warnings As Errors"
                                    PropertyPageName="Advanced"
                                    Description="If set to true, warnings will
be treated as errors."
                                    HelpURL="http://msdn.microsoft.com"
                                    Switch="/warnaserror"
                            />
```

FIG. 3b

```
                                        <StringProperty
                                              Name="SearchString"
                                              DisplayName="Search String"
                                              Description="Specifies the string to search for"
                                              HelpURL="http://msdn.microsoft.com"
                                              Switch="/search:[value]"
                                              Delimited="true"
                                        />
                                  </Properties>
                            </CustomBuildRule>
                  </Rules>
</VisualStudioToolFile>
```

FIG. 3c

```xml
<?xml version="1.0" encoding="utf-8" ?>
<xs:schema xmlns:xs="http://www.w3.org/2001/XMLSchema">
    <xs:element name="VisualStudioToolFile" type="VisualStudioToolFile" />
    <xs:complexType name="VisualStudioToolFile">
        <xs:choice minOccurs="0" maxOccurs="1">
            <xs:element name="Rules" maxOccurs="1" minOccurs="0">
                <xs:complexType>
                    <xs:sequence maxOccurs="unbounded" minOccurs="0">
                        <xs:element name="CustomBuildRule" type="CustomBuildRule" />
                    </xs:sequence>
                </xs:complexType>
            </xs:element>
        </xs:choice>
        <xs:attribute name="Name" type="xs:string" use="required" />
    </xs:complexType>
    <xs:complexType name="CustomBuildRule">
        <xs:sequence>
            <xs:element name="Properties" maxOccurs="1" minOccurs="0">
                <xs:complexType>
                    <xs:choice minOccurs="0" maxOccurs="unbounded">
                        <xs:element name="StringProperty" type="StringProperty" />
                        <xs:element name="EnumProperty" type="EnumProperty" />
                        <xs:element name="BooleanProperty" type="BooleanProperty" />
                        <xs:element name="IntegerProperty" type="IntegerProperty" />
                    </xs:choice>
                </xs:complexType>
            </xs:element>
        </xs:sequence>
        <xs:attribute name="Name" type="xs:string" use="required" />
        <xs:attribute name="DisplayName" type="xs:string" use="optional" />
        <xs:attribute name="CommandLine" type="xs:string" use="required" />
        <xs:attribute name="Outputs" type="xs:string" use="required" />
        <xs:attribute name="AdditionalDependencies" type="xs:string" use="optional" />
```

FIG. 4a

```
                    <xs:attribute name="FileExtensions" type="xs:string" use="required" />
                    <xs:attribute name="ExecutionDescription" type="xs:string" use="optional" default="Executing tool..." />
                    <xs:attribute name="SupportsFileBatching" type="xs:boolean" use="optional" />
                    <xs:attribute name="BatchingSeparator" type="xs:string" use="optional" default=" " />
                    <xs:attribute name="ShowOnlyRuleProperties" type="xs:boolean" use="optional" default="false" />
                </xs:complexType>
                <xs:complexType name="StringProperty">
                    <xs:complexContent>
                        <xs:extension base="Property">
                            <xs:sequence />
                            <xs:attribute name="Switch" type="xs:string" use="optional" />
                            <xs:attribute name="DefaultValue" type="xs:string" use="optional" />
                            <xs:attribute name="Delimited" type="xs:boolean" use="optional" default="false" />
                            <xs:attribute name="Delimiters" type="xs:string" use="optional" default=";," />
                            <xs:attribute name="Inheritable" type="xs:boolean" use="optional" default="false" />
                        </xs:extension>
                    </xs:complexContent>
                </xs:complexType>
                <xs:complexType name="EnumProperty">
                    <xs:complexContent>
                        <xs:extension base="Property">
                            <xs:sequence>
                                <xs:element name="Values" minOccurs="1" maxOccurs="1">
                                    <xs:complexType>
                                        <xs:sequence maxOccurs="unbounded" minOccurs="0">
                                            <xs:element name="EnumValue" type="EnumValue" />
                                        </xs:sequence>
                                    </xs:complexType>
                                </xs:element>
                            </xs:sequence>
                            <xs:attribute name="DefaultValue" type="xs:integer" use="optional" default="0" />
                        </xs:extension>
                    </xs:complexContent>
                </xs:complexType>
```

FIG. 4b

```
<xs:complexType name="EnumValue">
    <xs:sequence />
    <xs:attribute name="Switch" type="xs:string" use="optional" />
    <xs:attribute name="Value" type="xs:integer" use="required" />
    <xs:attribute name="DisplayName" type="xs:string" use="optional" />
</xs:complexType>
<xs:complexType name="BooleanProperty">
    <xs:complexContent>
        <xs:extension base="Property">
            <xs:sequence />
            <xs:attribute name="Switch" type="xs:string" use="optional" />
            <xs:attribute name="DefaultValue" type="xs:boolean" use="optional" default="false" />
        </xs:extension>
    </xs:complexContent>
</xs:complexType>
<xs:complexType name="IntegerProperty">
    <xs:complexContent>
        <xs:extension base="Property">
            <xs:sequence />
            <xs:attribute name="Switch" type="xs:string" use="optional" />
            <xs:attribute name="DefaultValue" type="xs:integer" use="optional" default="0" />
        </xs:extension>
    </xs:complexContent>
</xs:complexType>
<xs:complexType name="Property">
    <xs:sequence></xs:sequence>
    <xs:attribute name="Name" type="xs:string" use="required" />
    <xs:attribute name="IsReadOnly" type="xs:boolean" use="optional" default="false" />
    <xs:attribute name="DisplayName" type="xs:string" use="optional" />
    <xs:attribute name="Description" type="xs:string" use="optional" />
    <xs:attribute name="PropertyPageName" type="xs:string" use="optional" default="General" />
    <xs:attribute name="Category" type="xs:string" use="optional" />
    <xs:attribute name="HelpContext" type="xs:integer" use="optional" />
    <xs:attribute name="HelpFile" type="xs:string" use="optional" />
    <xs:attribute name="HelpURL" type="xs:string" use="optional" />
</xs:complexType>
</xs:schema>
```

FIG. 4c

INTEGRATION OF EXTERNAL TOOLS INTO AN EXISTING DESIGN ENVIRONMENT

FIELD OF THE INVENTION

The invention relates generally to programming tools and more particularly to a framework for enabling a programming tool to be integrated into a design environment.

BACKGROUND OF THE INVENTION

A build tool is a programming utility that may be used when building a new version of a program. For example, "Make" is a popular open source build tool that uses "makefile", a file that instructs the Make tool to perform build operations. Make is typically used to ensure that the latest source files (and the files that are dependent on them) will be compiled into a new version (build) of a program. Build tools are typically invoked by executing a command line instruction. A command line option is referred to as a switch and is an argument to a command that modifies the function of the utility rather than providing data. Options generally start with a character such as "-" in Unix or "/" in MS-DOS. The character is usually followed by a single letter or digit.

Currently, there is no easy way to extend a build system to integrate external tools (that is, tools not originally built in to an existing design environment) into a project system within a design environment so that the tools interact with the user in the same way that built-in tools interact, without changing the design environment programmatically. Some design environments support external tools to some extent by allowing a command line to be executed at a particular time in the build process. The command line typically must be typed in exactly as the command line will be executed for the project. If the same tool is used for multiple projects, each project will have a separate command line. The mechanism provided for integrating external tools, if present at all, is not user friendly or versatile. It would be helpful if there were an easier way to integrate external tools into an existing design environment in such a way that no coding is required, a familiar user interface is employed and a rich and versatile means of integration is provided, with the end result being that the integrated tool is indistinguishable from a built-in tool.

SUMMARY OF THE INVENTION

Custom build tools are integrated into a design environment build process in a way that is consistent with other built-in tools, without writing code. The result is that the user experience of an external tool is the same as the user experience of a built-in tool. Properties of the tool are defined in a file, which in some embodiments of the invention is an XML file. The properties, describe among other things, the appropriate syntax of the tool's command line. Values are specified for a particular use of the tool in a particular project. At runtime the command line for the tool is programmatically generated from the generalized syntax as defined in the file and the current stored dynamic property values. At build time, the command line so generated may be executed.

Properties and values are created or modified by a user interface or via a scripting language.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 3a-c illustrate an exemplary tool file in accordance with one embodiment of the invention;

FIGS. 4a-c illustrate an exemplary schema in accordance with one embodiment of the invention;

DETAILED DESCRIPTION OF ILLUSTRATIVE EMBODIMENTS

Overview

Custom build rules enable integration of custom build tools into a design environment build process in a way that is consistent with other built-in tools, without writing code. The result is that the user experience of an external tool is the same as the user experience of a built-in tool. Properties of the tool are defined in a file, which in some embodiments of the invention is an XML file. These properties describe, among other things, the appropriate syntax of the tool's command line. Values are specified for a particular use of the tool in a particular project. While the generalized syntax of the tool's command line is static, the executable command line is dynamically generated, that is, at runtime the command line for the tool is generated from the generalized syntax and the current stored dynamic property values. At build time, the command line so generated may be executed.

Exemplary Computing Environment

Figure 1:
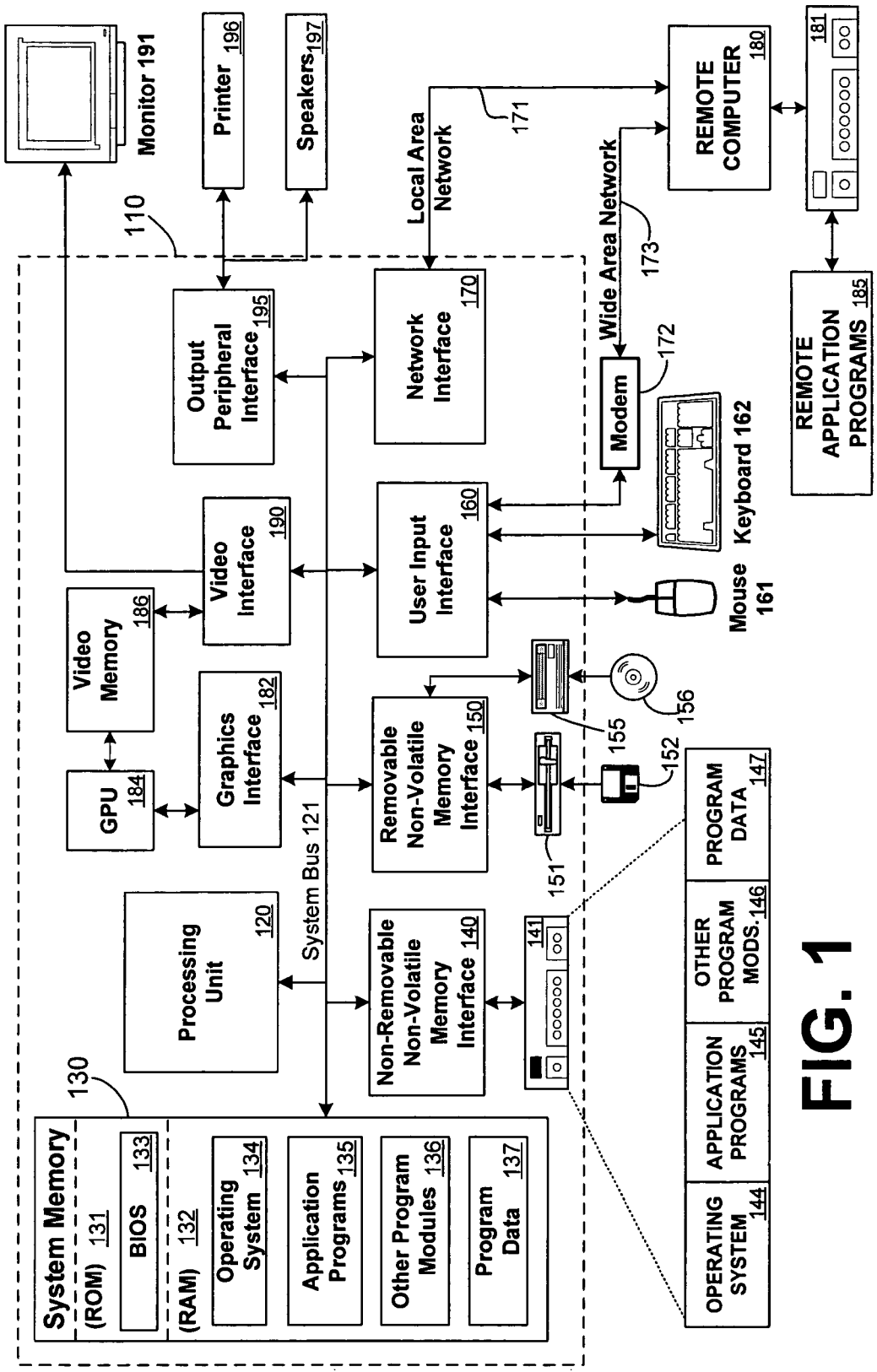
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Integration of an External Tool into a Design Environment

Figure 2:
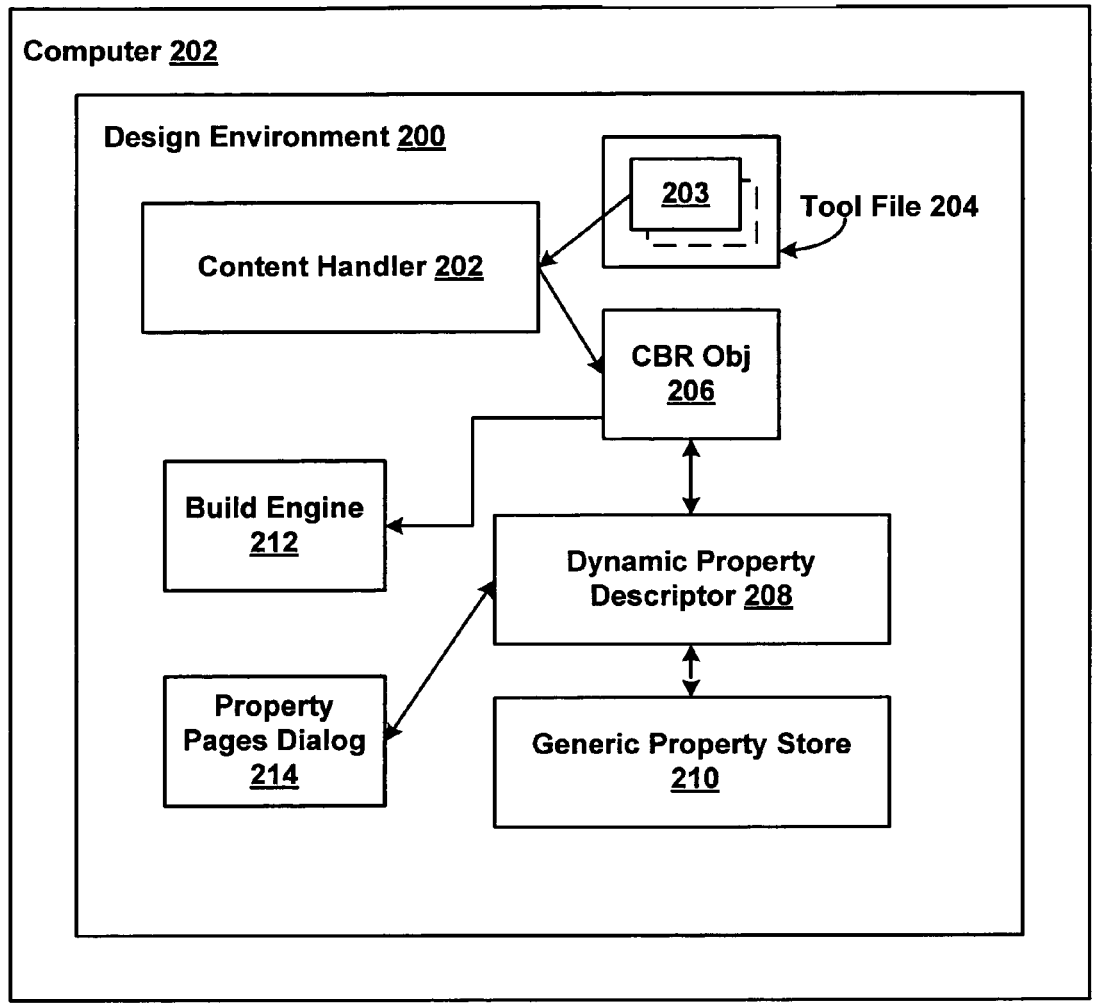
FIG. 2 is a block diagram of an exemplary system for integrating an external tool into a design environment in accordance with one embodiment of the invention.

FIG. 2 illustrates an exemplary system for integrating a tool into an existing design environment in accordance with one embodiment of the invention. Referring now to FIG. 2, computer 202 represents a computer, such as computer 110 described with respect to FIG. 1, on which the invention may reside. The invention may be implemented as a component of a design/build portion of a design environment, such as design environment 200, or alternatively, may be implemented as a stand-alone component. Exemplary design environments in which the invention may be implemented or with which the invention may be associated include MICROSOFT VISUAL STUDIO.NET, or DREAMWEAVER by MACROMEDIA or BORLAND C++ BUILDER STUDIO 6 or any other software development/design tool, compiler or environment.

In one embodiment of the invention, one or more custom build rules (such as exemplary custom build rule 203) is described in a tool file 204. The tool file 204 may be a text file such as, for example, an XML file that adheres to a tool file schema (not shown). The tool file may be validated against the tool file schema. An exemplary tool file is illustrated in FIGS. 3a-3c. An exemplary tool file schema is illustrated in FIGS. 4a-4c.

The tool file 204 includes and defines one or more custom build rules 203, etc. and describes the custom build rule properties of each custom build rule. Custom build rule properties include attributes of the custom build rule, such as the file extensions of files that are input to and output from the custom build rule processing, the name of the custom build rule, and one or more command lines to run when the custom build rule is invoked. The tool file may include a generalized description of the syntax of a command line that is run when the tool is executed. In some embodiments of the invention, the command line syntax description contains one or more tags for indicating where evaluated properties are placed on the command line.

Some of the properties described in the custom build rule may be dynamic properties, meaning that these properties are evaluated and added to the custom build rule object at execution time. Each dynamic property may be described by type, how the dynamic property is translated or transformed into the command line, and how the dynamic property is displayed in a user interface.

In some embodiments of the invention, Boolean, integer, string and enumeration are valid property types. For example, for a Boolean property, the switch representation may be placed on the command line if the value for the property is "true". If the value for the property is "false", the switch representation may not be placed on the command line. An exemplary dynamic Boolean property might be, for example, "Warn as Error". The "Warn as Error" property may, for example, cause all warnings encountered in a build operation to be treated as errors, if the value for the property is "true". A property of integer type enables the specification of a number to be appended onto the appropriate switch at runtime. Similarly, type enumeration (enum) represents a set of values of integer type and type string enables the specification of text values. A property of type string may represent either a single string that is put on the command line or a number of strings that are placed on the command line. In some embodiments, multiple strings are delimited by a character (specified in the tool file) that acts as a delimiter, (e.g., comma or semicolon are often used as delimiters although other delimiters may be specified) resulting in the generation of multiple switches at runtime. During the transformation process, the delimiters may be removed and a separate switch generated for each string.

For example, suppose a tool called "foo" has an option or switch (/I) that enables the specification of a list of directories to be searched. Suppose that the list of directories to be searched are: c:\foo, c:\bar and c:\foobar. Typically, in known systems, the user would have to input a command line such as the following, each time the tool is run:

foo.exe /I c:\foo /I c:\bar /I c:\foobar

The command line is static and there is no known way to transform the static command line into multiple properties on different property pages or to categorize these switches into a friendlier view of the command line. For example, typically, the user would have to remember the command line switches and command line switch syntax for the tool.

In accordance with some embodiments of the invention, in contrast to the above, a custom build rule for a tool may enable each switch to be placed on the command line to be described and integrated via user interfaces or via a scripting language, into an existing property model that translates properties into command line switches. In some embodiments of the invention, a user interface may provide any combination of the following features: a description of the tool, a list of one or more options (command line switches) for the tool, a description of one or more properties of the tool option(s), a list or other suitable assistance with respect to the possible command line switch values, and/or automatic translation of the information input into the appropriate command line syntax for the tool. In accordance with the invention, in some embodiments, a command line includes the name of a tool to be executed and one or more properties associated with the tool. For example, in the following command line:

foo.exe [IncludeDirectories]

"foo.exe" is the name of a tool executable or binary and "IncludeDirectories" is the name of an exemplary dynamic property associated with the tool foo. "[IncludeDirectories]" (the dynamic property enclosed within delimiting characters "[ ]") is referred to herein as a tag. Although in the example, square brackets are used as the delimiting characters, it will be understood that any suitable delimiters may be chosen, such as but not limited to parentheses, curly brackets, single and double quotation marks and so on. One or more switch properties may be specified for the dynamic property, and one or more values may be specified for each switch property value. The switch property may describe or define the syntax of the command line. For example, suppose a switch property is specified for IncludeDirectories. For example, suppose "/I [value]" is specified as the IncludeDirectories' Switch property and suppose the value(s) stored in the generic property store for the IncludeDirectories' Switch property /I [value] is "c:\foo;c:\bar;c:\foobar".

When the tool is executed, the above command line is parsed: "foo.exe" is recognized as the tool to be executed, and the above command line syntax evaluates into one or more switches, in which the specific values are separated out and are transformed into the appropriate switch representation for the property. For example, during runtime, the following executable command line may be generated (and presumably may then be executed):

foo.exe /I c:\foo /I c:\bar /I c:\foobar

When the command line is parsed, in some embodiments, the dynamic property name (e.g., IncludeDirectories) is used to query a dynamic property descriptor. The dynamic property descriptor returns the object that represents the dynamic property and the values stored in the generic property store for that dynamic property and switch. The object is queried for the switch representation (that is, what should appear on the command line for the value(s) returned from the generic property store) and the tag is replaced with the switch representation for the specific value(s).

In some embodiments of the invention, the tool file specifies the delimiter and the transformation rules and the generalized command line in the syntax expected by the particular tool. One tool file can be used with multiple projects, each project describing the command line according to its individual requirements. That is, for example, project one may define its IncludeDirectories to include the foo and bar directories while project two defines its IncludeDirectories to include the bar and foobar directories, both projects using the same tool file.

The tool file 204 is read by or into a content handler 202. The content handler 202 may be responsible for processing the custom build rule(s), (e.g., custom build rule 203, etc.) in the tool file 204 and interacting with the design environment object model in the way dictated by the tool file 204. The content handler 202, in one embodiment of the invention, creates a custom build rule object (e.g., custom build rule object 206 associated with custom build rule 203) by reading in the tool file, adding properties defined in the tool file to the custom build rule object and setting the specified values on the custom build rule object that is output. In some embodiments of the invention, content handler 202 interprets the XML content of the tool file to create the custom build rule object(s) in the manner specified by the XML file contents.

Custom build rule object 206 in some embodiments of the invention, stores the build rule properties of custom build rule 203. The custom build rule object in some embodiments also transforms the command level representation of the command line into the final (executable) command line given to the build engine, when a build is initiated. The custom build rule object 206 also associates, (e.g., through inheritance or encapsulation), with a dynamic property descriptor 208. The dynamic property descriptor 208 stores the description of each property of custom build rule 203. In some embodiments the above is implemented using the C++ computer programming language and a Component Object Model (COM) technology but any number of technologies or object based languages or combinations thereof may be used for implementation.

A dynamic property descriptor 208 interacts with the tool file 204 to expose the property information stored in the tool file 204 for a custom build rule 203. The dynamic property descriptor 208 also interacts with the generic property store 210 (e.g., by doing stores and retrieves. For example, in the earlier example of the IncludeDirectories property, a store interaction would store the property called IncludeDirectories, with the values c:\foo;c:\bar, etc. while the retrieve would retrieve the IncludeDirectories property and its values for the particular project.)

The generic property store 210 is a data store and may be implemented as a basic data structure (e.g., a data structure suitable for implementing a map).

The tool file, build rules and dynamic properties of the custom build rule may be created, edited or deleted by invoking a property dialog 214. In some embodiments of the invention, the property dialog 214 displays various categories of properties. The way the property is displayed within the property dialog 214 may be controlled by the tool file 204. The dynamic property descriptor 208 is capable of copying a subset of the universe of available properties to another dynamic property descriptor (not shown) so that the list of properties can be divided between one or more categories of properties. For example, certain properties of the custom build rule may be categorized as "advanced" and therefore may be separated out onto a separate property page (for use, for example, by advanced users).

When a build is initiated, a build engine such as build engine 212 may communicate with the custom build rule object 206 to obtain the command lines that should be spawned. The custom build rule object 206 may in turn communicate with the dynamic property descriptor 208 to evaluate the command line switch representation of the dynamic properties of the custom build rule 203 based on the value currently held in the generic property store 210. The custom build rule object 206 may return one or more command lines that should be spawned. The build engine 212 in some embodiments, is responsible for spawning and executing the command lines.

Figure 5:
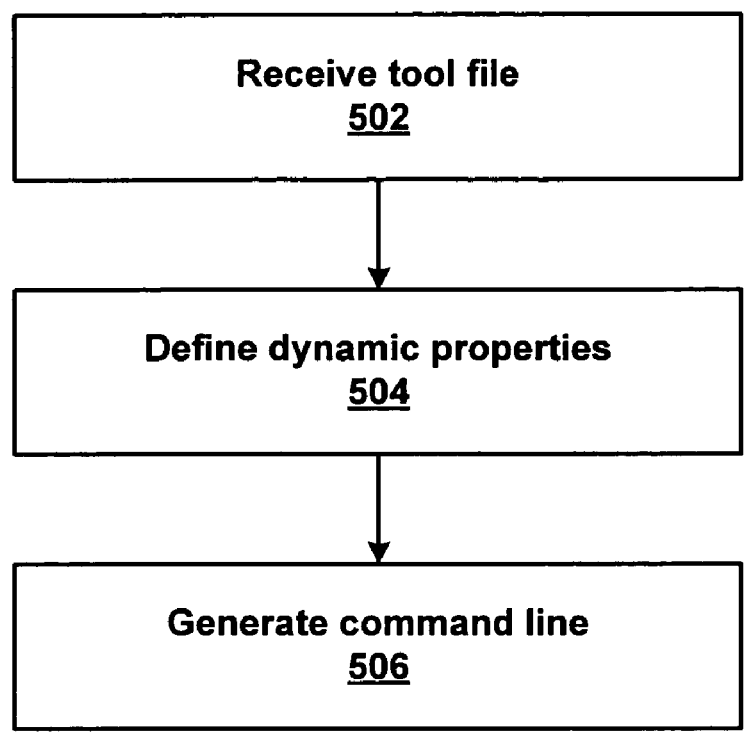
FIG. 5 is a flow diagram of a method of integrating an external tool into a design environment in accordance with one embodiment of the invention.

FIG. 5 illustrates an exemplary process for integrating an external tool into an existing design environment in accordance with one embodiment of the invention. At step 502 a tool file is received. The tool file may either be provided by the tool author or another or may be created. At step 504 dynamic properties are defined, assigning particular values to a use of the tool in a particular project and at step 506, a command line is generated using the particular values selected for the particular project.

Figure 6:
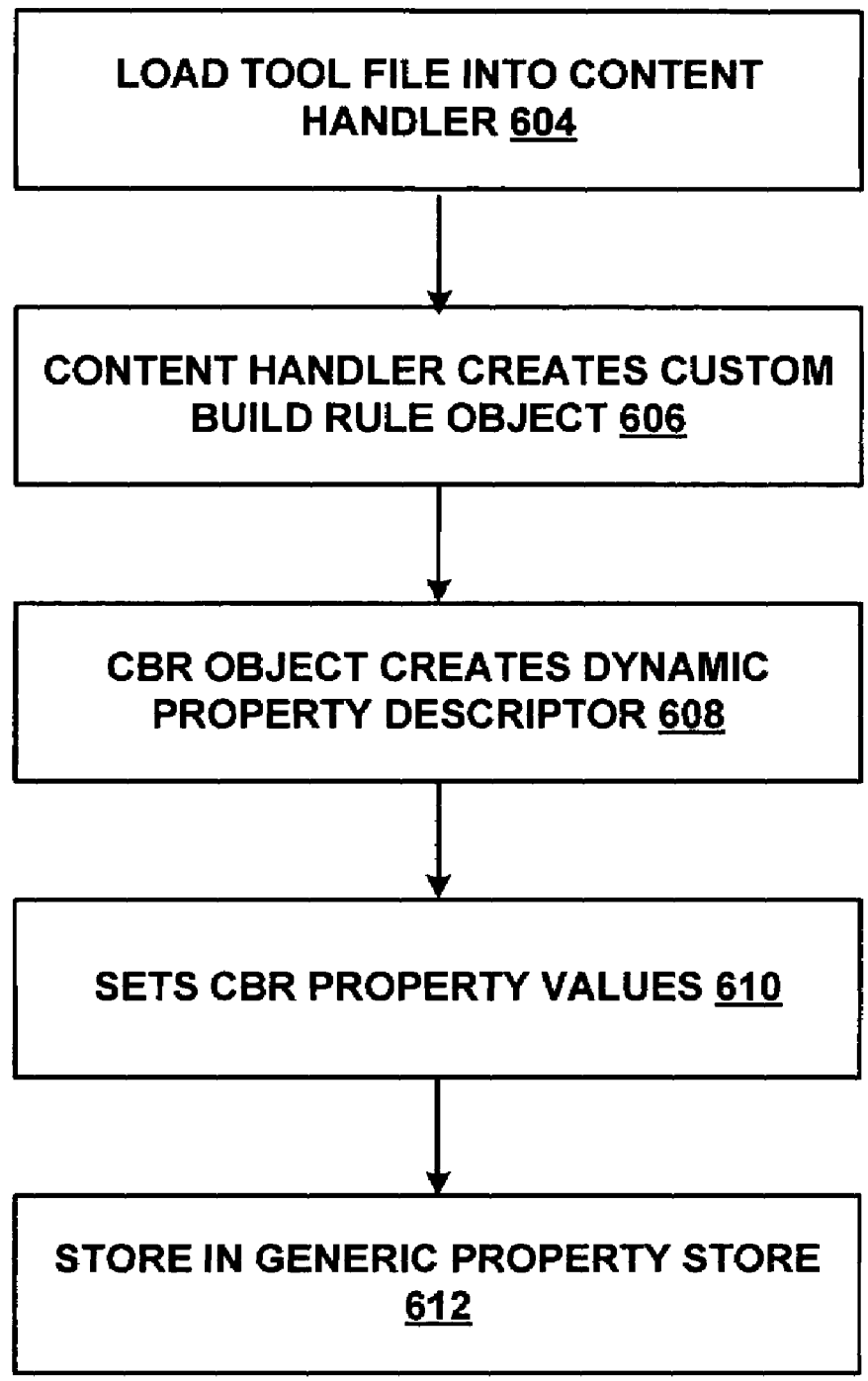
FIG. 6 is a flow diagram of a portion of the method of integrating an external tool into a design environment of FIG. 5 in accordance with one embodiment of the invention.

FIG. 6 illustrates a portion of the process of FIG. 5, which is performed, for example, when a project is loaded or during design time. At step 604, the tool file (e.g., tool file 204) is loaded into a content handler, such as the content handler 202 discussed above. At step 606 a custom build rule object (such as the custom build rule object 206 discussed above) is created. At step 608 a dynamic property descriptor, (e.g., dynamic property descriptor 208), is created by the custom build rule object. The custom build rule object may also add properties to the dynamic property descriptor from the tool file. Steps 606 and 608 may be repeated any number of times for each custom build rule in the tool file. At step 610 the property values are set and at step 612 the property values are stored in the generic property store.

Figure 7:
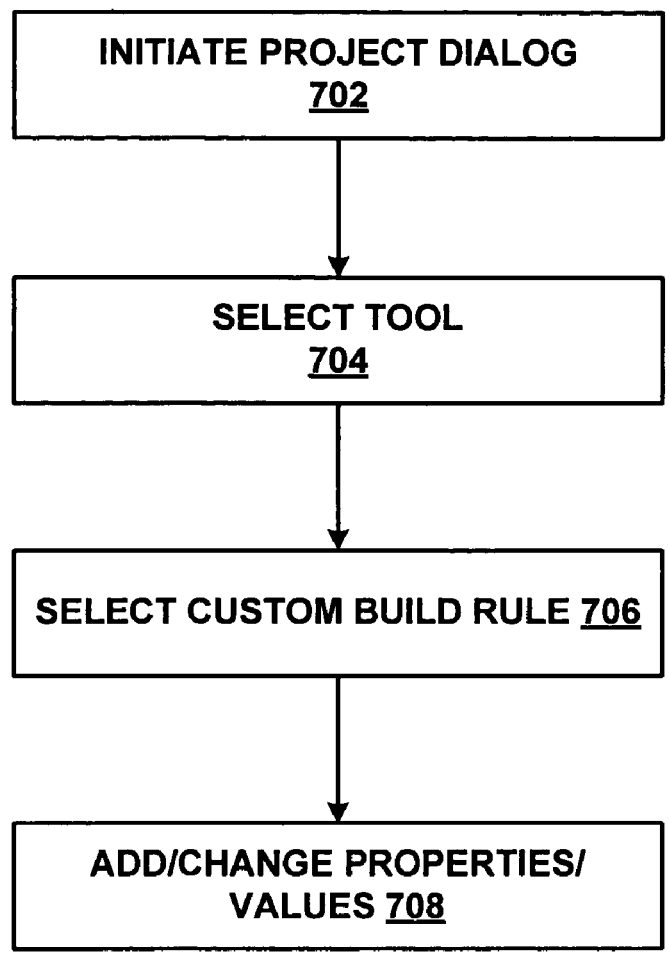
FIG. 7 is a flow diagram of another portion of the method of integrating an external tool into a design environment of FIG. 5 in accordance with one embodiment of the invention.

FIG. 7 illustrates a portion of a method of integrating an external tool, that is adding or changing properties of a custom build rule, according to some embodiments of the invention. At step 702 a dialog is initiated. At step 704 a tool may be selected or a new tool may be added. At step 706, one or more build rules may be selected and added to the tool file or may be created and added to the tool file. At step 708, one or more dynamic properties associated with the custom build rule may be created or modified. Values may be specified for the switch value.

Figure 8A:
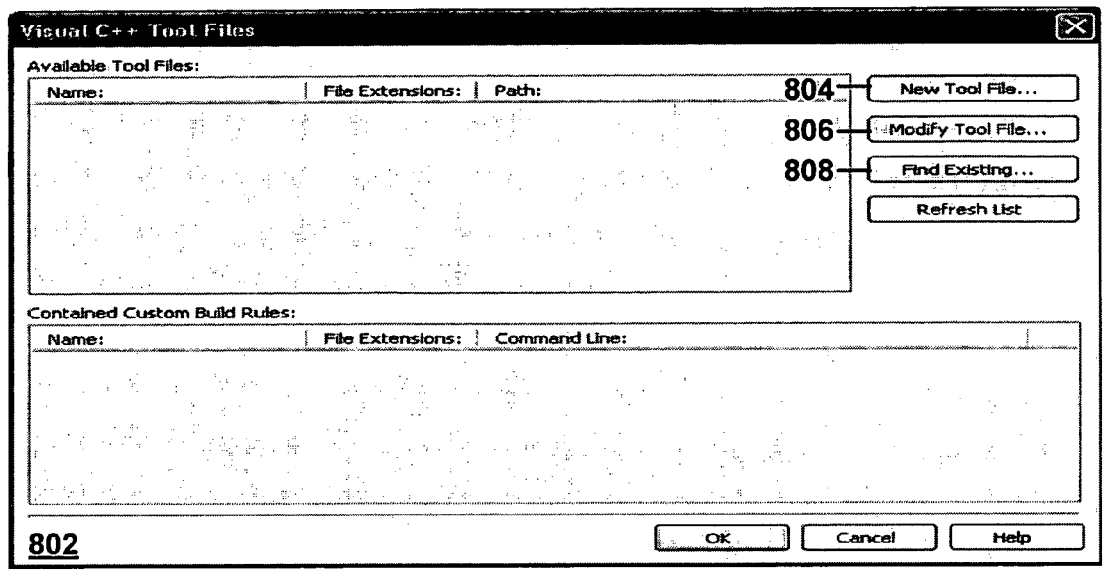
FIGS. 8a-k are exemplary screen shots of a user interface for integrating an external tool into a design environment in accordance with one embodiment of the invention.

FIG. 8a illustrates an exemplary user interface in accordance with some embodiments of the invention. In the exemplary user interface of FIG. 8a, no tool files are available to be used. A new tool file may be created by selecting option 804 ("New Tool File"), an existing tool file can be modified by selecting option 806 ("Modify Tool File") or an existing tool file can be located by selecting option 808 ("Find Existing"). Suppose option 804, "New Tool File" is selected. A user interface such as exemplary user interface 810 ("New Tool File") may be displayed. In exemplary user interface 810, the Foo Tool File 812 is being created. A save location 814 (c:\foo.tool) may be specified and one or more build rules can be added (816), or one or more existing custom build rules can be modified (818) or deleted (820).

Figure 8B:
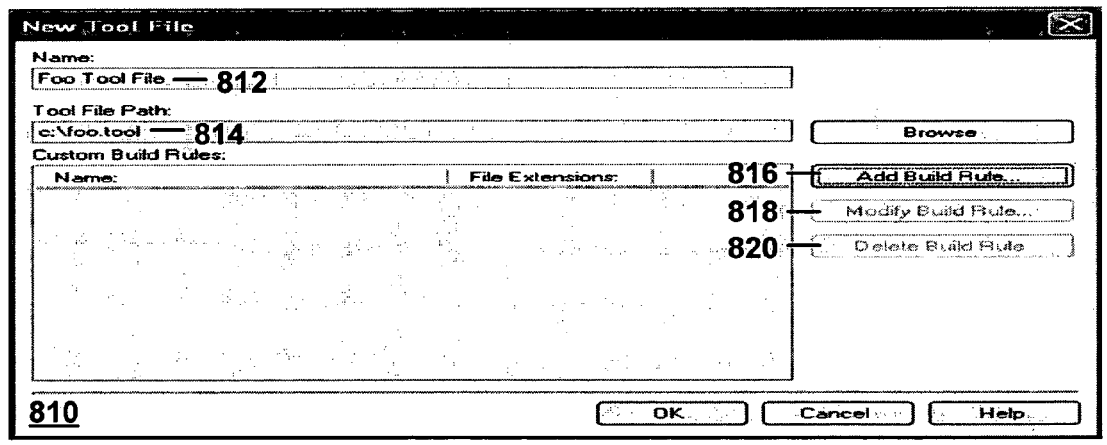
Figure 8C:
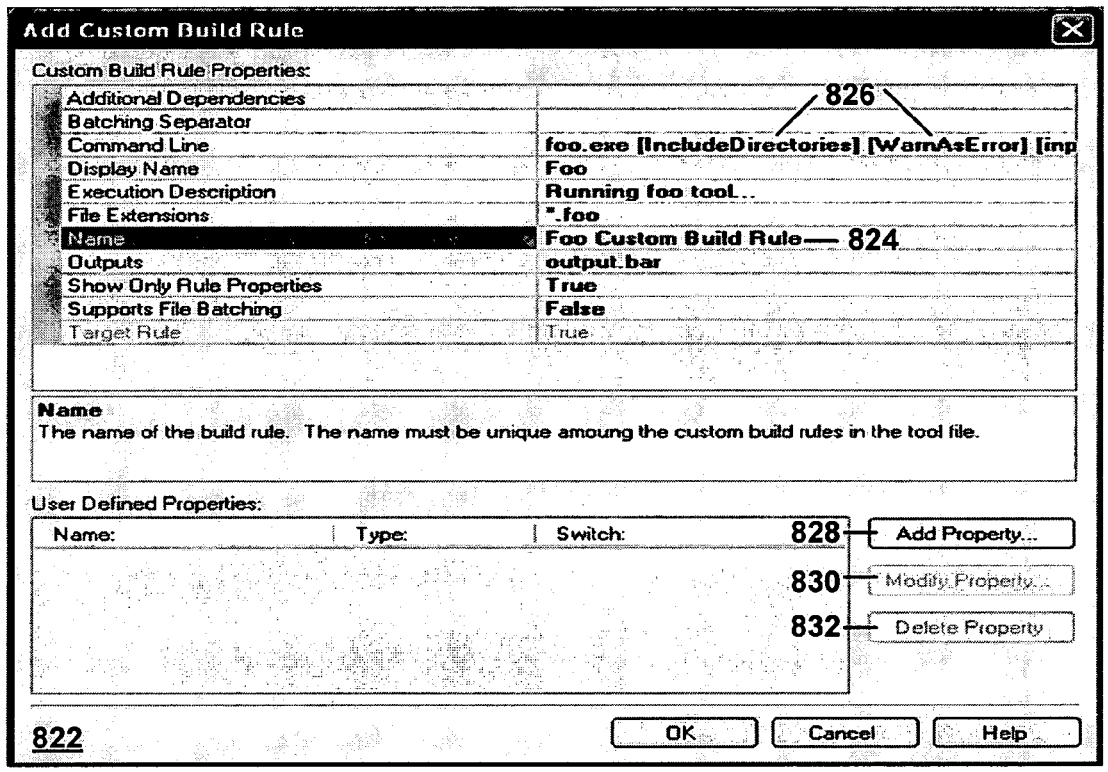
Figure 8D:
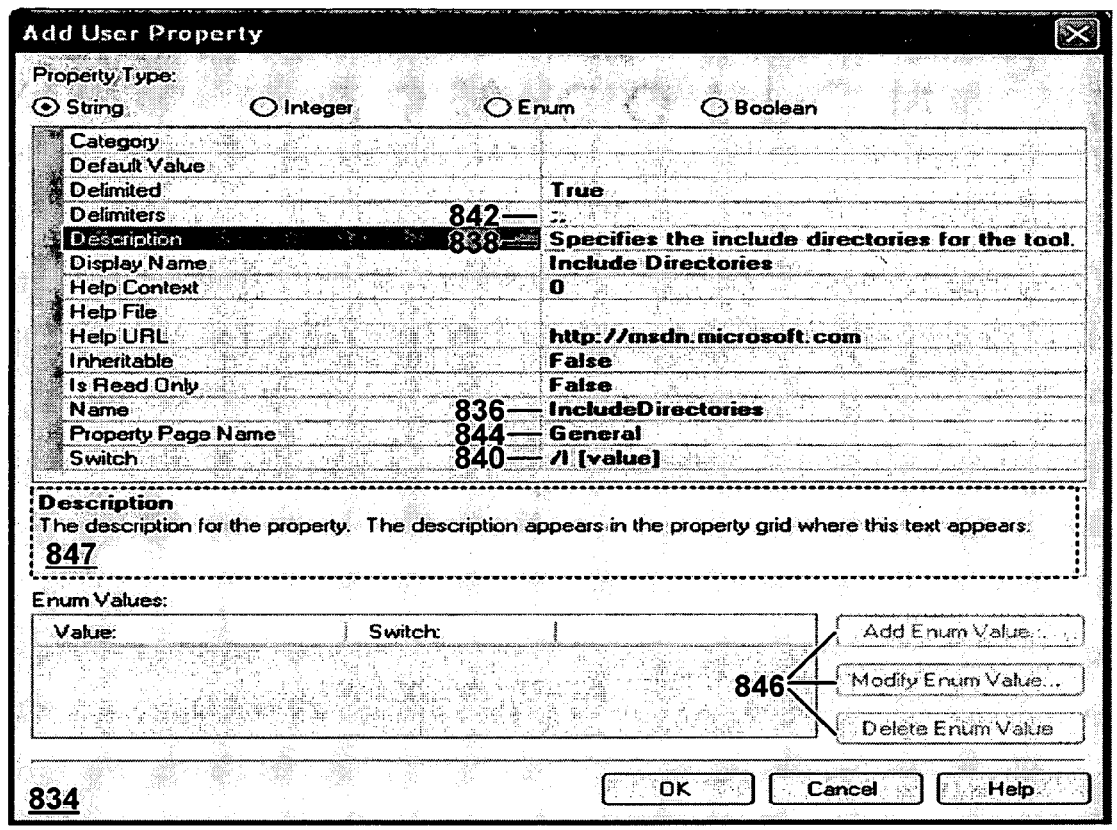

Suppose "Add Build Rule" 816 is selected. A user interface such as exemplary user interface 822 ("Add Custom Build Rule") of FIG. 8c may be displayed. In exemplary user interface 822 "Foo Custom Build Rule" 824 is being created. "Foo Custom Build Rule" 824 has two dynamic properties 826 ("IncludeDirectories" and "WarnAsError"). Dynamic properties can be added 828 ("Add Property"), modified 830 ("Modify Property") or deleted 832 ("Delete Property").

In exemplary user interface 834 ("Add User Property"), the add user property dialog for the Include Directories property is displayed. The dynamic property name 836 ("IncludeDirectories"), a description 838 ("Specifies the include directories for the tool."), the switch 840 ("/I [value]"), the delimiters 842 (";,"), the property page name to which this property belongs 844 ("General") and other appropriate information including but not limited to category, default value, delimited (true/false), display name, help context, help file, help URL, inheritable, is read only and so on may be may be specified. "IncludeDirectories" is a string property, but had the property displayed been an enum property, enum values could be added, modified or deleted 846. A helpful description of the selected item may be displayed, as illustrated by description 847.

Figure 8E:
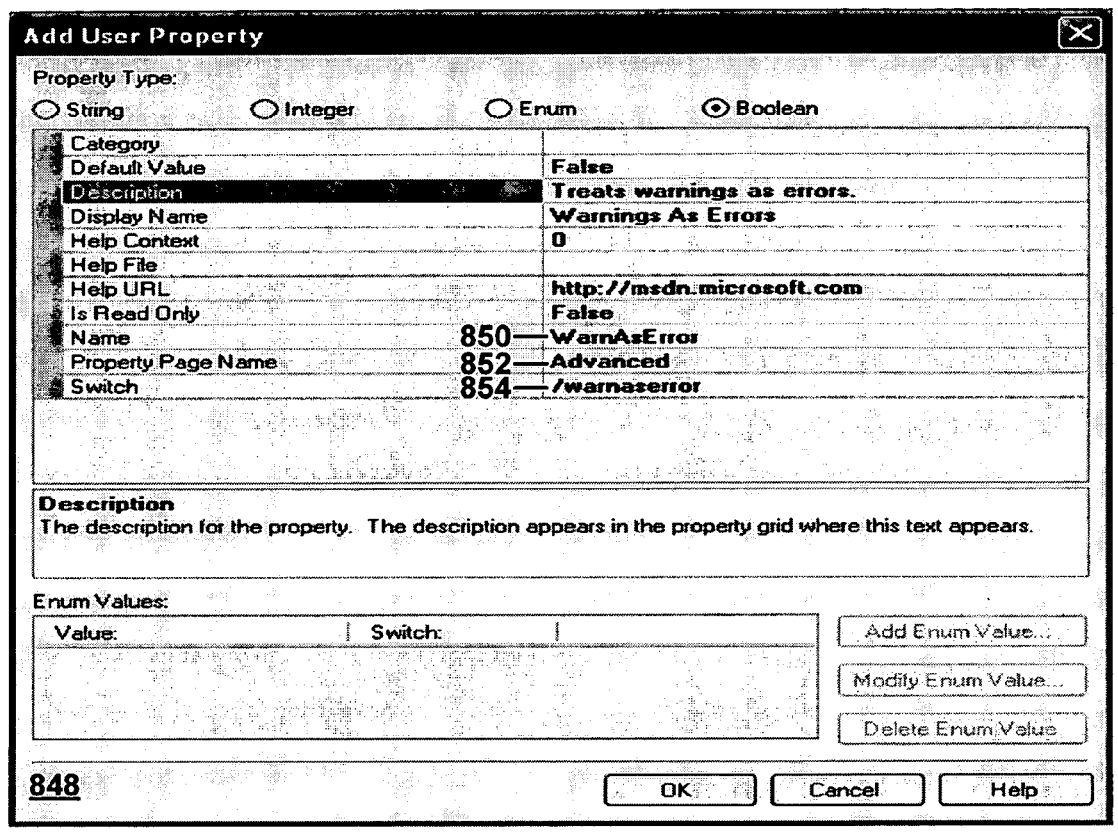
Figure 8F:
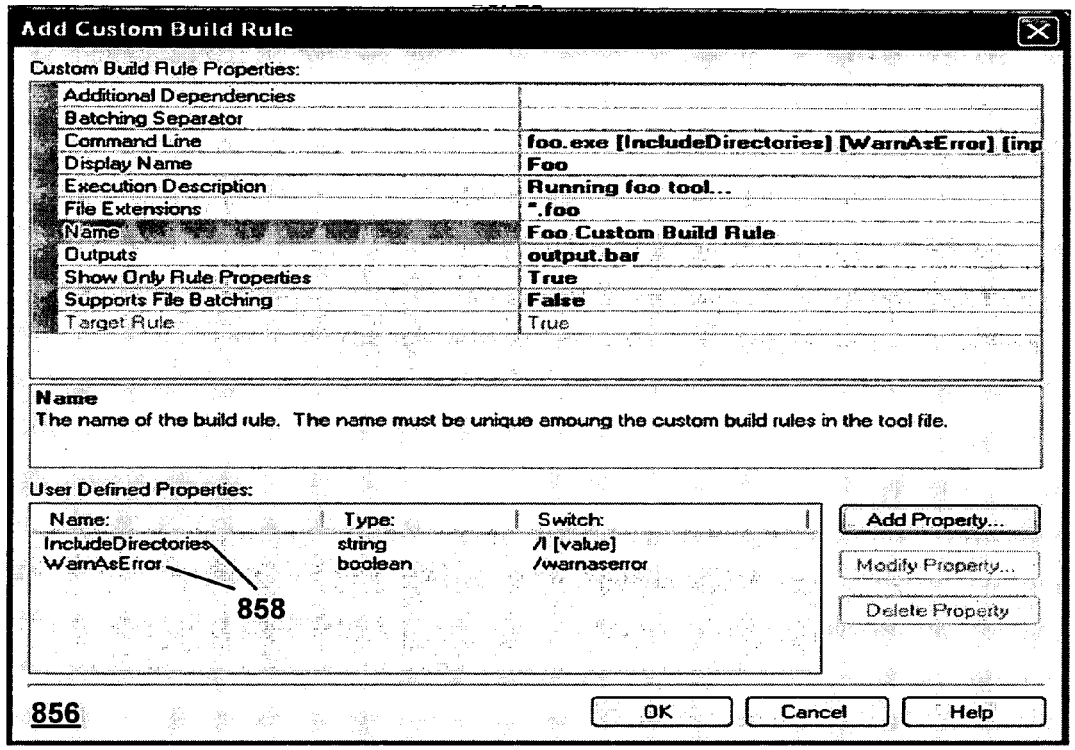
Figure 8G:
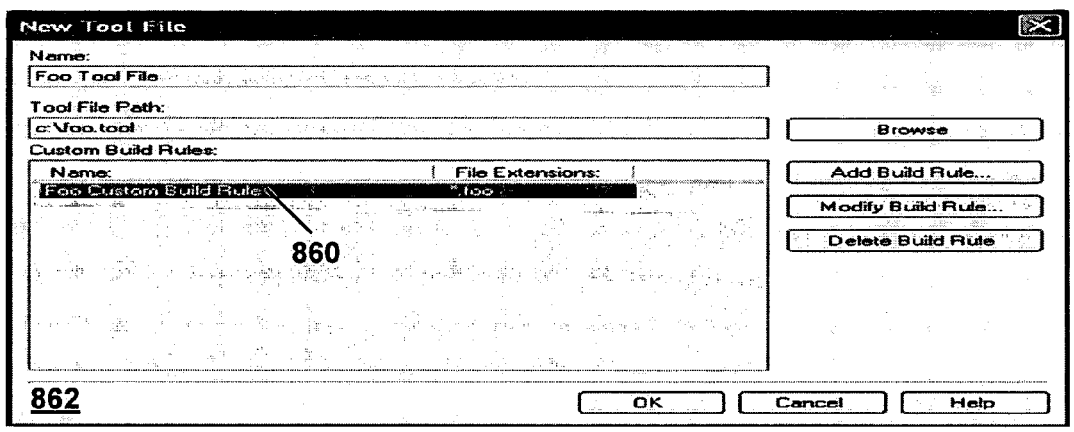

FIG. 8e illustrates an exemplary user interface 848 for the WarnAsError 850 property, which is to appear on the Advanced property page 852. The switch value 854 ("/warnaserror") will be placed on the command line if the property is set to true. FIG. 8f illustrates an exemplary user interface 856 that shows the user interface of FIG. 8c after the dynamic properties IncludeDirectories and WarnAsError 858 have been added to the custom build rule. FIG. 8g illustrates the user interface of FIG. 8b after the "Foo Custom Build Rule" 860 has been created (user interface 862).

Figure 8H:
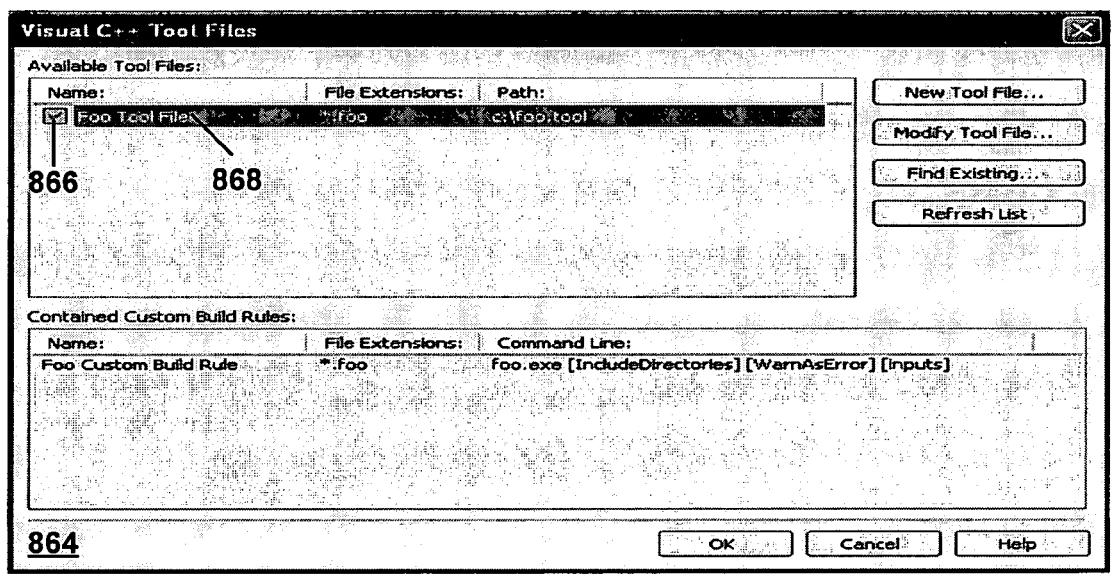

FIG. 8h illustrates an exemplary user interface FIG. 8a after the "Foo Tool File" 866 has been created, with is associated custom build rule, ("Foo Custom Build Rule"). A checkbox 868 allows a tool file to be selected to be used with a particular project.

Figure 8I:
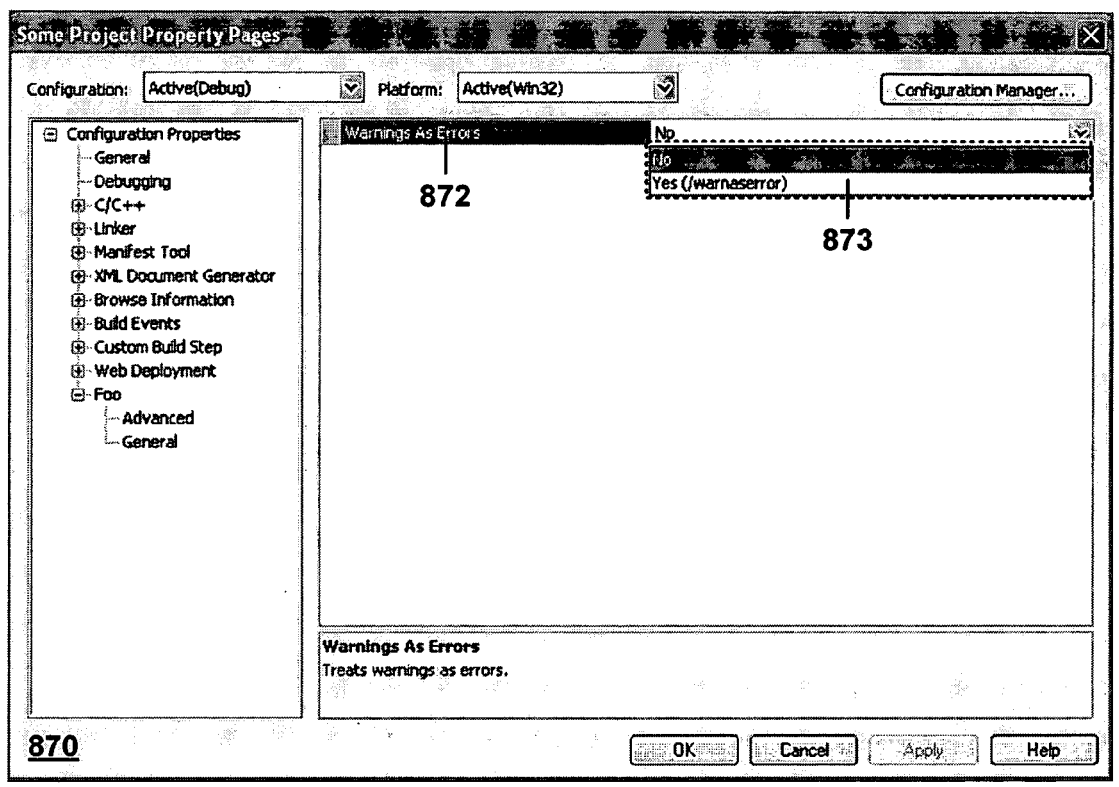
Figure 8J:
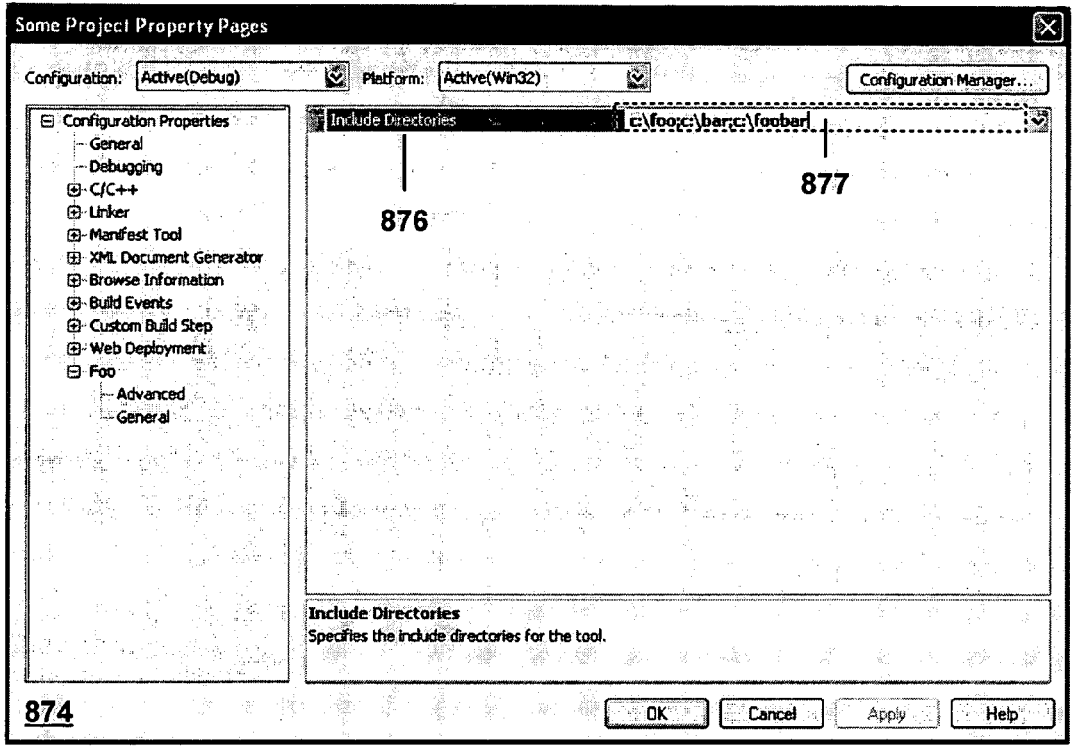
Figure 8K:
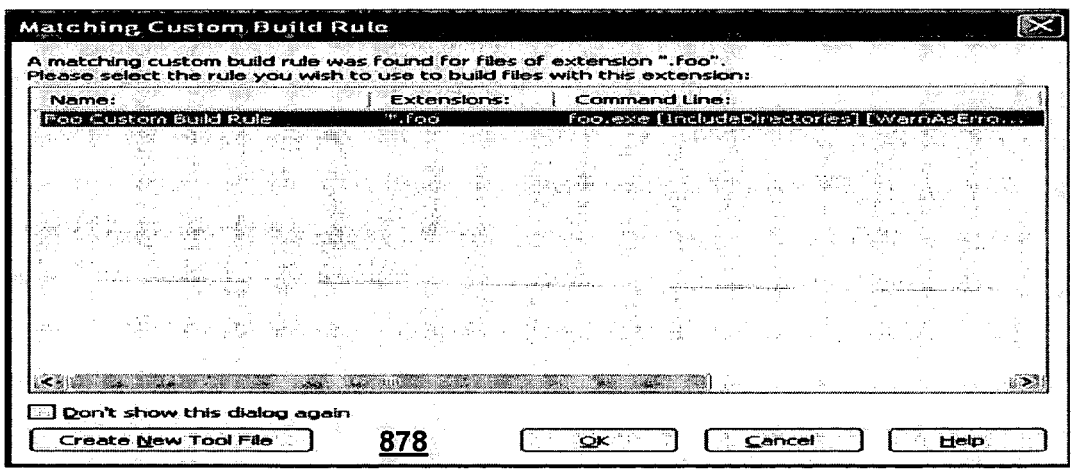

FIG. 8i illustrates an exemplary "Advanced" property page 870 showing the advanced property "Warnings As Errors" 872. The desired value for the dynamic property can be chosen from the selection box 873. FIG. 8j illustrates an exemplary "General" property page 874 showing the general property "Include Directories" 876. The desired value for the dynamic property can be entered in the entry box 877. FIG. 8k illustrates an exemplary user interface 878 that may be displayed in some embodiments of the invention if a file is added to a project. In this case, a matching build rule for the file with extension "foo" may be automatically located and displayed to enable the association of the tool file containing that rule (i.e., Foo Custom Build Rule).

Given the inputs as shown in the above exemplary screen shots, the following processing may occur. At build time, the custom build rule command line appears as follows:

foo.exe [IncludeDirectories] [WarnAsError]

The statement above may be parsed and the [IncludeDirectories] tag in some embodiments is replaced with the value of the dynamic property "IncludeDirectories". If IncludeDirectories is set to "c:\foo;c:\bar;c:\foobar", as shown in the example, [IncludeDirectories] may be replaced with "/I c:\foo /I c:\bar /I c:\foobar". In some embodiments, if the string property were not delimited, "c:\foo;c:\bar;c:\foobar" would be replaced with "/I c:\foo;c:\bar;c:\foobar". If the property were empty (i.e., nothing was specified) the [IncludeDirectories] tag may be removed from the command line.

Similarly, the [WarnAsError] tag in some embodiments is parsed and replaced with the switch value of the WarnAsError property if the property is set to true or the tag is removed from the command line if the property is set to false. If the property is set to true, the tag may be replaced with "/warnaserror".

In some embodiments of the invention, a tag called [inputs] enables the specification of the location of the input files associated with the rule (e.g., all the .foo files in the project). An exemplary custom build rule command line having the [input] tag may appear as follows:

foo.exe [IncludeDirectories] [WarnAsError] [inputs]

The [input] tag is replaced with the input files having the specified extension. For example, using the Foo Tool File and Foo Custom Build Rule developed in the above example, if there are two .foo files in the project, a.foo and b.foo, the [input] tag would be replaced with "a.foo b.foo", the command line generated thus being:

foo.exe /I c:\foo /I c:\bar /I c:\foobar /warnaserror a.foo b.foo

The above command line is the executable command line.

Figure 9:
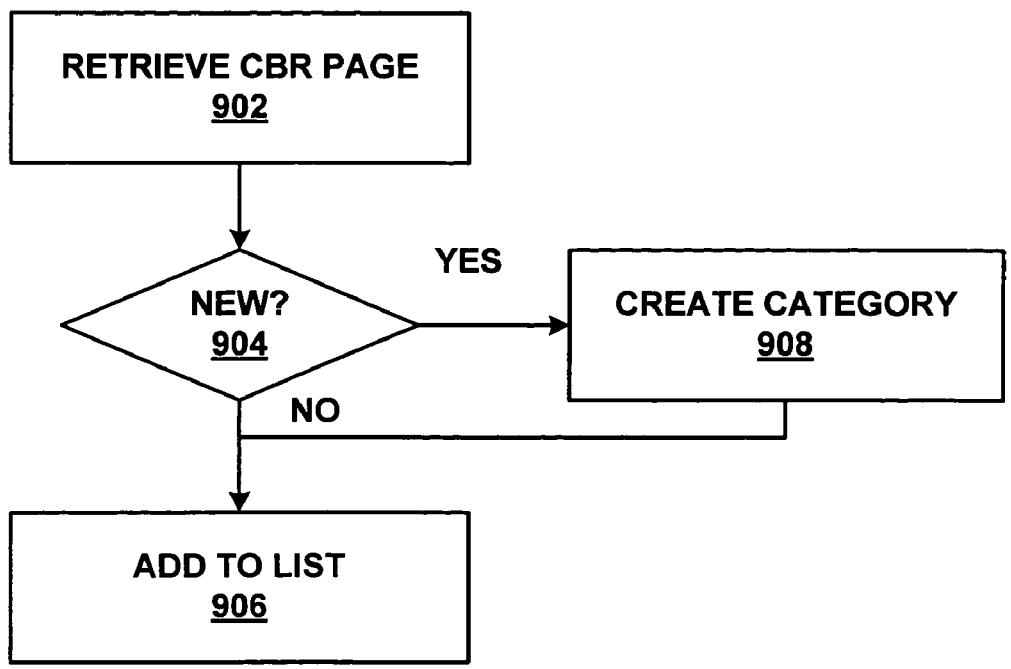
FIG. 9 is a flow diagram of another portion of the method of integrating an external tool into a design environment of FIG. 5 in accordance with one embodiment of the invention.

FIG. 9 illustrates another portion of the method of FIG. 5. When the user dialog (for example, as illustrated by exemplary user interfaces FIGS. 8a-k) is initiated, at step 902 each custom build rule (e.g., Foo Custom Build Rule) in the project is retrieved and queried for its property pages (e.g., "Advanced" and "General" in the examples are the property pages) from the dynamic property descriptor. The list of property pages is dynamic because each of the properties defined in the tool file, can be defined as to which page it will be displayed on. Hence, when the dialog is displayed, the list of properties is mapped into lists of properties belonging on particular pages. Each property is accessed and the page on which it belongs is determined. If the property belongs on the "Advanced" page, it is added to the list of advanced properties; if the property belongs on the "General" page, it is added to the list of general properties. After the lists of properties for each page are created, a page object representing the property page is created for each page. Type information for each property is copied into the page object for each exposed property from the property descriptor.

If the property is new, (step 904) a category for the list is created, (step 908) and the property is added to the category list (step 906). For example, in the examples of FIGS. 8a-8k, there is one property that belongs on the "Advanced" list (WarnAsError) and one that belongs on the "General" list (IncludeDirectories).

In some embodiments of the invention, instead of creating custom build rules and adding properties and through user interfaces as described above, custom build rules and properties may be created via a scripting language.

Figure 10:
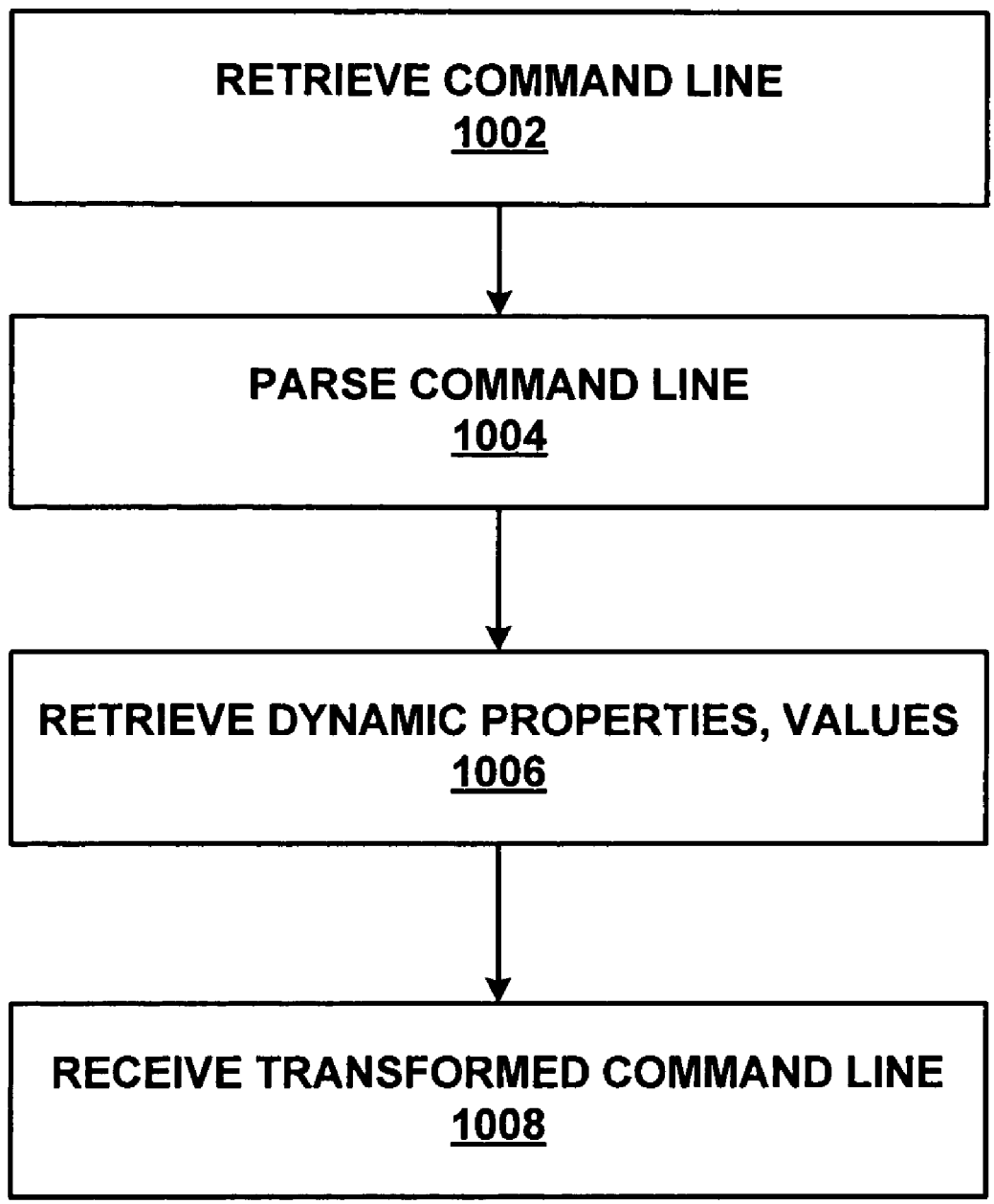
FIG. 10 is a flow diagram of a potion of the method of FIG. 5 in accordance with one embodiment of the invention.

FIG. 10 illustrates another portion of the method for integrating an external tool into a design environment of FIG. 5. At step 1002 a build engine requests the generalized command lines for a custom build rule for a tool in a project. At step 1004 the generalized command line as specified in the tool file (e.g., tool file 204) is parsed. At step 1006, the appropriate custom build rule object is asked for its command lines. For each tag encountered in the command line the custom build rule object asks the dynamic property descriptor for the object that represents that dynamic property and the property value(s) from the generic property store. At step 1008 the custom build rule is asked to return the transformed representation for the current value(s) retrieved from the property store. The transformed command line may then be executed by the build engine. This process is repeated for each custom build rule in a tool file and for each tool file in a project.

In some embodiments of the invention, a property may set different switches depending on other properties' current values. When a non-value tag (i.e., a property tag) is encountered the custom build rule object may be requested to transform the property or get the switch representation for the property. In some embodiments of the invention, if the tag is neither a value or a property tag, the tag is replaced with an empty string. In some embodiments of the invention, if the tag is a value tag, the tag is replaced with the current value for the tag from the generic property store. If it is not a value tag, the custom build rule object is requested for the appropriate switch representation and processing continues as step 1006.

It will be appreciated that although discussed herein within the context of a build environment and build tools, the invention as contemplated is not so limited. Any software may be integrated within any software environment, using the above described methods and techniques. The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Similarly it will be understood that although the test framework is described within the context of an automated way of testing software, the invention is not so limited and may be used wherever the scheduling of processes within a standardized format is useful, as for example in the context of business processes. Therefore, the present invention should not be limited to any single embodiment, but rather should be construed in breadth and scope in accordance with the appended claims.

What is claimed:

1. A computer system for integrating a tool into a design environment comprising:
   a processor and a memory;
   a tool file stored in the memory, the tool file representing the tool to be integrated into the design environment and comprising a custom build rule for the tool that includes a generalized description of the syntax of a command line that is run when the tool is executed, the generalized description of the syntax of the command line including at least one tag identifying a dynamic property of a command line switch of the command line,
   a generic property store in the memory that stores values for the dynamic property of the command line switch; and a content handler executing on the processor that receives the tool file and generates from the custom build rule a custom build rule object, the custom build rule object evaluating the dynamic property of the command line switch and automatically replacing the tag in the generalized description of the command line with one or more values from the generic property store to transform the generalized description of the command line into an executable command line comprising the name of the tool to be executed and one or more command line switch properties associated with the tool.

2. The computer system of claim 1, wherein the tool file is associated with a schema.

3. The computer system of claim 1, wherein the tool file comprises an XML file.

4. The computer system of claim 3, wherein the XML file is associated with an XML schema.

5. The computer system of claim 4, wherein the XML file is validated against the XML schema.

6. The computer system of claim 1, further comprising a dialog for adding or modifying the tool file.

7. The computer system of claim 1, further comprising a dialog for adding or modifying the custom build rule.

8. The computer system of claim 1, further comprising a dialog for adding or modifying the dynamic property of the custom build rule.

9. A computer-implemented method for integrating a build tool into a design environment on a computer system that comprises a processor and a memory, the method comprising:
   storing a tool file in the memory of the computer system, the tool file representing the tool to be integrated into the design environment and comprising a custom build rule for the tool that includes a generalized description of the syntax of a command line that is run when the tool is executed, the generalized description of the syntax of the command line including at least one tag identifying a dynamic property of a command line switch of the command line,
   storing in a generic property store in the memory values for the dynamic property of the command line switch;
   generating, by the processor, from the custom build rule in the tool file a custom build rule object;
   evaluating, by the processor, via the custom build rule object the dynamic property of the command line switch and automatically replacing the tag in the generalized description of the command line with one or more values from a generic property store in the memory to transform the generalized description of the command line into an executable command line comprising the name of the tool to be executed and one or more command line switch properties associated with the tool; and
   executing, by the processor, the executable command line to invoke the tool in the design environment.

10. The method of claim 9, wherein the tool file is an XML file.

11. The method of claim 10, wherein the XML file is associated with an XML schema and the XML file is validated against the XML schema.

12. The method of claim 9, wherein the build rule object generated from the build rule creates a dynamic property descriptor.

13. The method of claim 9, wherein the one or more values with which the tag is replaced are associated with a particular use of the build rule in a project.

14. A computer-readable storage medium comprising computer-executable instructions for integrating a build tool into a design environment on a computer system by:
   storing a tool file in a memory of the computer system, the tool file representing the tool to be integrated into the design environment and comprising a custom build rule for the tool that includes a generalized description of the syntax of a command line that is run when the tool is executed, the generalized description of the syntax of the command line including at least one tag identifying a dynamic property of a command line switch of the command line,
   storing in a generic property store in the memory values for the dynamic property of the command line switch;
   generating from the custom build rule in the tool file a custom build rule object;
   evaluating via the custom build rule object the dynamic property of the command line switch and automatically replacing the tag in the generalized description of the command line with one or more values from a generic property store in the memory to transform the generalized description of the command line into an executable command line comprising the name of the tool to be executed and one or more command line switch properties associated with the tool; and
   executing the executable command line to invoke the tool in the design environment.

* * * * *